United States Patent [19]
Griech et al.

[11] Patent Number: 5,996,924
[45] Date of Patent: Dec. 7, 1999

[54] BELT RETRACTOR FOR A VEHICULAR OCCUPANT RESTRAINT SYSTEM

[75] Inventors: Hermann Griech, Staufenberg; Alberto Margalef, Leinzell; Klaus Schiele, Welzheim-Breitenfürst; Hermann-Karl Weller, Alfdorf, all of Germany

[73] Assignee: TRW Occupant Restraint Systems GmbH, Aldorf, Germany

[21] Appl. No.: 09/106,642

[22] Filed: Jun. 29, 1998

[30] Foreign Application Priority Data

Jul. 1, 1997 [DE] Germany ............. 297 11 457 U

[51] Int. Cl.⁶ .................................................. B60R 22/34
[52] U.S. Cl. ........................ 242/379; 411/386; 411/413
[58] Field of Search .................... 242/379; 280/803, 280/805, 806, 807, 808; 297/474–479; 411/386, 412, 413, 414

[56] References Cited

U.S. PATENT DOCUMENTS

| 4,600,343 | 7/1986 | Frerejacques | 411/386 |
|---|---|---|---|
| 4,637,764 | 1/1987 | Imai | 411/386 |
| 5,609,454 | 3/1997 | Lee | 411/412 |
| 5,845,861 | 12/1998 | Weller et al. | 242/379 |

Primary Examiner—John M. Jillions
Attorney, Agent, or Firm—Tarolli, Sundheim, Covell, Tummino & Szabo LLP

[57] ABSTRACT

A belt retractor for a vehicular occupant restraint system has a load-bearing frame and a stud for securing the belt retractor to a vehicle. The stud has a free end facing away from the frame, this free end being provided with a connecting projection. The connecting projection is provided with a guide pin for a nut adapted to be screwed on the stud.

7 Claims, 1 Drawing Sheet

BELT RETRACTOR FOR A VEHICULAR OCCUPANT RESTRAINT SYSTEM

The invention relates to a belt retractor for a vehicular occupant restraint system.

BACKGROUND OF THE INVENTION

Conventional belt retractors for a vehicular occupant restraint system include a load-bearing frame and a stud for securing the belt retractor to a vehicle.

If such a belt retractor needs to be fitted at a location of the vehicle at which the stud for securing the belt retractor is difficult to access, it is expedient to make the stud longer to have a guide for the nut to significantly simplify screwing it onto the stud. However, making the stud longer results in a considerable increase in weight.

BRIEF DESCRIPTION OF THE INVENTION

The invention provides a belt retractor for a vehicular occupant restraint system, having a load-bearing frame and a stud for securing the belt retractor to a vehicle. The stud has a free end facing away from the frame, this free end being provided with a connecting projection. The connecting projection is provided with a guide pin for a nut adapted to be screwed on the stud. The guide pin is thus configured as a part separate from the stud so that a suitable material can be used, preferably plastic material. This results in a considerable weight saving although the strength needed for guiding the nut is assured.

In accordance with a preferred embodiment of the invention it is provided for that the connecting projection features a male thread and the guide pin a mating female thread to fix the guide pin on the connecting projection. Thus the guide pin can be screwed onto the connecting projection and removed therefrom which is particularly of advantage in case a guide pin already screwed on is damaged during transport prior to being fitted.

In accordance with the preferred embodiment it is further provided for that the guide pin features a load-relief space adjoining the bottom of the female thread. In the same way as a relief groove or load-relief notch this load-relief space diminishes the notch effect at the bottom of the female thread as a result of which the resistance of the guide pin to fracture is increased.

Special aspects of the invention read from the sub-claims.

BRIEF DESCRIPTION OF THE DRAWINGS

The invention will now be described with reference to a preferred embodiment illustrated in the attached drawings, in which.

DETAILED DESCRIPTION OF THE INVENTION

Figure 1:
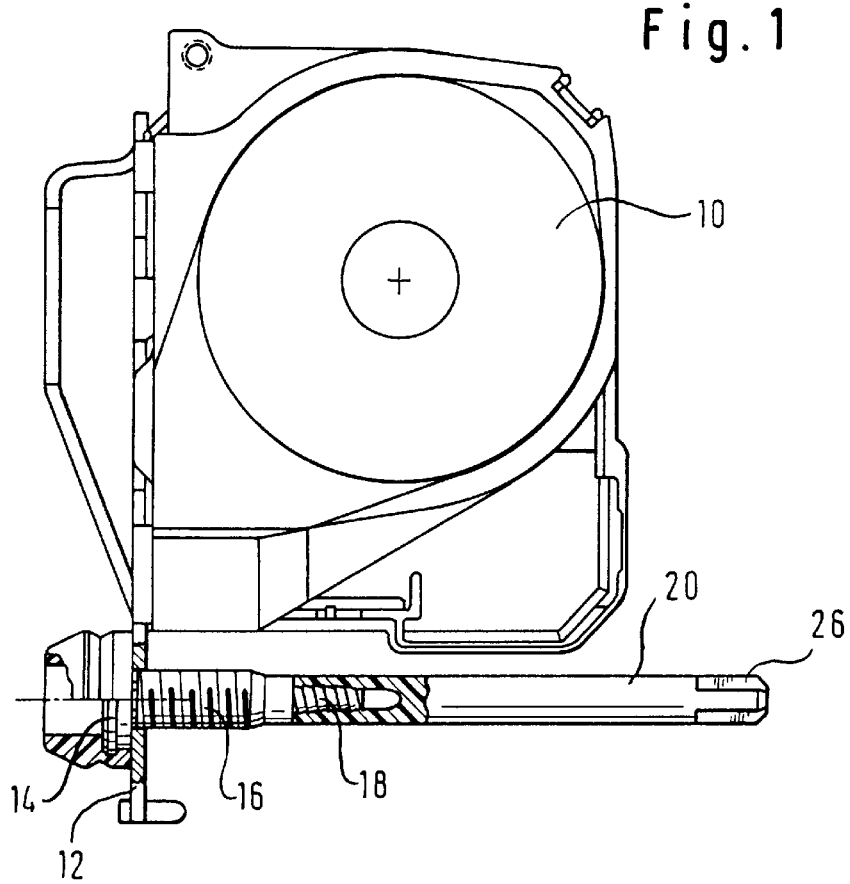
FIG. 1 is a schematic partly sectioned side view of a belt retractor in accordance with the invention.
Figure 2:
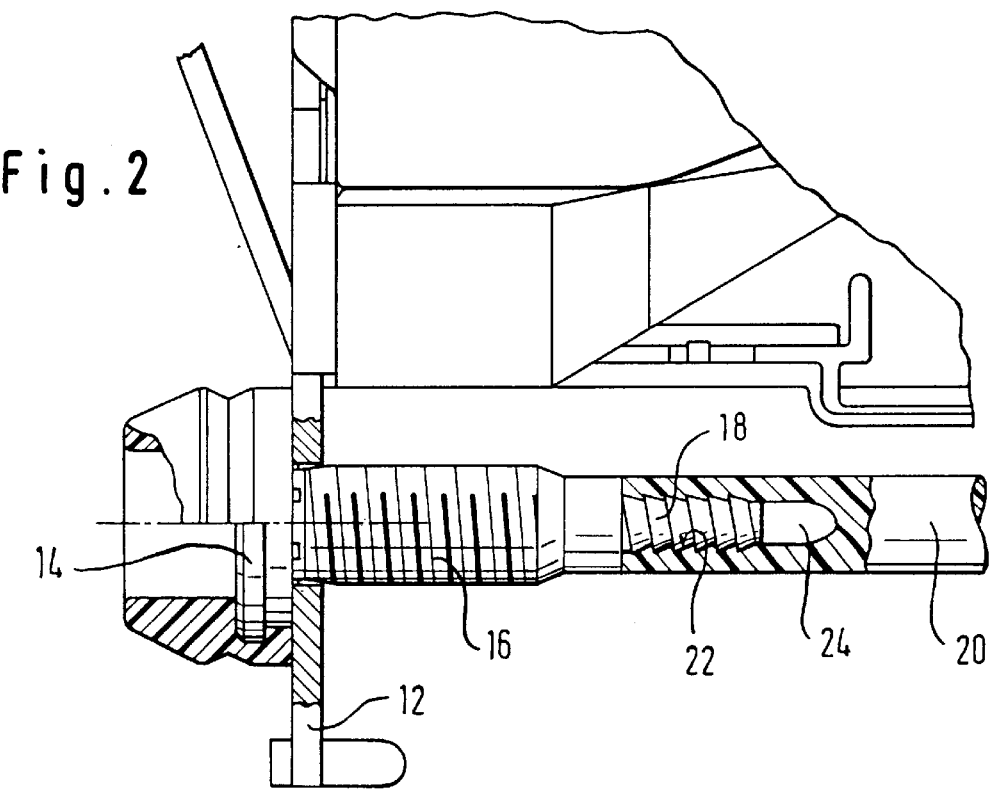
FIG. 2 is a partial view of the belt retractor as shown in FIG. 1 with an enlarged scale.

FIG. 1 illustrates a belt retractor 10 in accordance with the invention in a schematic side view. Apart from the usual functional parts, it features a load-bearing frame 12 provided with a stud 14. This stud serves to secure the belt retractor 10 to the vehicle and is provided with a male thread 16 onto which a nut can be screwed. At its end facing away from the load-bearing frame 12, the stud 14 is provided with a connecting projection 18 (see also FIG. 2) featuring a male thread. In the embodiment illustrated the male thread is configured as a breech block thread; however, other types of a thread are possible, too. Screwed onto the male thread on the connecting projection 18 is a guide pin 20 featuring for this purpose a hole having a female thread 22 mating the male thread on the connecting projection 18. By employing a breech block thread for the male thread on the connecting projection 18 and for the female thread 22 on the guide pin 20, a particularly high retaining force materializes. Provided at the bottom of the hole formed by the female thread 22 is a load-relief space 24 which diminishes the notch effect at the transition from the female thread 22 to the body of the pin 20.

Figure 3:
FIG. 3 is a schematic cross-sectional view of the guide pin as shown in FIG. 1.

As apparent from FIG. 3, the free end 26 of the guide pin 20 facing away from the frame 12 is provided with a cross-shaped cross-section which facilitates screwing the guide pin 20 onto the connecting projection 18.

In accordance with a variant (not shown), the connecting projection may be provided with grooves instead of the male thread, these grooves engaging mating noses provided in the interior of the guide pin 20. As an alternative, the grooves could also be configured in the interior of the guide pin whilst the noses are provided on the connecting projection. However, once the guide pin 20 in this variant has been mounted on the connecting projection 18, it can no longer be released therefrom.

The guide pin 20 is made of plastic material thus resulting in a particularly low weight for the guide pin 20 whilst simultaneously assuring adequate strength for guiding the nut to be screwed onto the male thread 16.

We claim:

1. A belt retractor for a vehicular occupant restraint system, having a load-bearing frame and a stud for securing said belt retractor to a vehicle, said stud having a free end facing away from said frame, said end being provided with a connecting projection, said connecting projection being provided with a guide pin for a nut adapted to be screwed on said stud, said guide pin being made of plastic material.

2. The belt retractor of claim 1, wherein said guide pin has a front end facing away from said stud, at least said front end having a cross-shaped cross-section.

3. A belt retractor for a vehicular occupant restraint system, having a load-bearing frame and a stud for securing said belt retractor to a vehicle, said stud having a free end facing away from said frame, said end being provided with a connecting projection, said connecting projection being provided with a guide pin for a nut adapted to be screwed on said stud, said connecting projection being provided with grooves and said guide pin being provided with complementary noses engaging said grooves and fixing said guide pin on said connecting projection.

4. The belt retractor of claim 3, wherein said guide pin is made of plastic material.

5. A belt retractor for a vehicular occupant restraint system, having a load-bearing frame and a stud for securing said belt retractor to a vehicle, said stud having a free end facing away from said frame, said end being provided with a connecting projection, said connecting projection being provided with a guide pin for a nut adapted to be screwed on said stud, said connecting projection being provided with a male thread and said guide pin being provided with a complementary female thread for fixing said guide pin on said connecting projection.

6. The belt retractor of claim 5, wherein said male thread on said connecting projection is a breech block thread.

7. The belt retractor of claim 5, wherein said guide pin features a load-relief space adjoining a bottom of said female thread.

* * * * *